United States Patent
Mehra et al.

(10) Patent No.: US 10,212,600 B1
(45) Date of Patent: Feb. 19, 2019

(54) CONTEXTUAL SIGNALING SYSTEM 7 (SS7) FIREWALL AND ASSOCIATED METHOD OF USE

(71) Applicant: Syniverse Technologies, LLC, Tampa, FL (US)

(72) Inventors: Karan Mehra, Wesley Chapel, FL (US); James F. Evans, Lutz, FL (US); Jon Sexson, Lutz, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/120,770

(22) Filed: Sep. 4, 2018

Related U.S. Application Data

(60) Provisional application No. 62/609,857, filed on Dec. 22, 2017.

(51) Int. Cl.
| | |
|---|---|
| *H04W 4/00* | (2018.01) |
| *H04W 12/08* | (2009.01) |
| *H04L 29/06* | (2006.01) |
| *H04W 8/10* | (2009.01) |

(52) U.S. Cl.
CPC ......... *H04W 12/08* (2013.01); *H04L 63/0236* (2013.01); *H04W 8/10* (2013.01)

(58) Field of Classification Search
None
See application file for complete search history.

(56) References Cited

U.S. PATENT DOCUMENTS

| | | | | |
|---|---|---|---|---|
| 6,308,276 | B1 | 10/2001 | Ashdown et al. | |
| 7,532,647 | B2* | 5/2009 | Eichler | H04L 47/10 370/524 |
| 2004/0156495 | A1* | 8/2004 | Chava | H04L 45/00 379/392 |
| 2004/0196858 | A1* | 10/2004 | Tsai | H04L 45/00 370/401 |
| 2016/0156647 | A1 | 6/2016 | Engel et al. | |

OTHER PUBLICATIONS

Positive Technologies SS7 Attack Discovery Data Sheet, Positive Technologies, Feb. 2, 2016, https://www.ptsecurity.com/upload/ptcom/PT-SS7-AD-Data-Sheet-eng.pdf accessed Oct. 1, 2018.
Signalling Firewall, Cellusys, https://www.cellusys.com/security-solutions/signalling-firewall/ accessed Oct. 1, 2018.

(Continued)

*Primary Examiner* — Erika A Washington
(74) *Attorney, Agent, or Firm* — Molly L. Sauter; Smith & Hopen, P.A.

(57) ABSTRACT

A contextual SS7 firewall filter is inserted between a network operator and its roaming partners intra network and inter network SS7 traffic. SS7 firewall filter validates GSM MAP and GSM CAP messages based on specific criteria as provisioned for those message types and either allows them or blocks them from reaching their intended destination based on the validation results. The validation step involves verification of MSU correctness, verification of correctness of SS7 MTP fields for each MSU, and verification of correctness of SS7 SCCP fields for each MSU. SS7 firewall filter blocks GSM messages that fail at least one of the verification steps.

20 Claims, 15 Drawing Sheets

(56) References Cited

OTHER PUBLICATIONS

AdaptiveMobile Signalling Protection, AdaptiveMobile Security, https://www.adaptivemobile.com/products/signalling-protection accessed Oct. 1, 2018.

Protecting your business from SS7 attacks, Symsoft, CLX Communications, https://www.symsoft.com/market-challenges/protecting-business-ss7-attacks/ accessed Oct. 1, 2018.

Feest, C. Protecting Mobile Networks from SS7 Attacks, Telesoft White Papers, Jun. 23, 2015.

Anam's easy to configure Signalling Firewall protects mobile networks from attacks arriving over the global Signalling (SS7 and Diameter) network. Signalling Firewall, ANAM Technologies Ltd., http://www.anam.com/signalling-firewall/ accessed Aug. 25, 2017.

\* cited by examiner

US 10,212,600 B1

CONTEXTUAL SIGNALING SYSTEM 7 (SS7) FIREWALL AND ASSOCIATED METHOD OF USE

CROSS-REFERENCE TO RELATED APPLICATIONS

This application claims priority to U.S. Provisional Patent Application No. 62/609,857, entitled "CONTEXTUAL SS7 FIREWALL," filed Dec. 22, 2017, the entirety of which is incorporated herein by reference.

BACKGROUND OF THE INVENTION

1. Field of the Invention

This invention relates generally to the field of telecommunications networks. Specifically, it relates to a contextual Signaling System 7 (SS7) firewall for providing Message Signaling Unit (MSU) validation and ensuring MSU correctness.

2. Description of the Related Art

Signaling System 7 (SS7) is a system connecting one mobile phone network to another mobile phone network. The majority of SS7 networks use protocols defined by the American National Standards Institute (ANSI) and the International Telecommunications Union (ITU). SS7 is essentially a set of protocols allowing phone networks to exchange the information needed for passing calls and text messages between each other and to ensure correct billing. It also allows users on one network to roam on another network, such as when travelling in a foreign country.

In order to protect SS7 networks from fraudulent attacks, vendors and carriers have implemented SS7-based firewalls that screen and filter SS7 signaling traffic and work in tandem with the SS7 Signaling Control Points (SCPs) to either allow or block routing through SS7 interconnects. However, the systems and method currently known in the art are not always effective in blocking malicious actors from bypassing the pre-determined set of criteria implemented by the firewall, allowing unlawful access to SS7 networks and compromising the integrity of the message traffic over the network.

Accordingly, what is needed in the art is an improved system and method for identifying fraudulent activity on an SS7 network and for either allowing or blocking traffic based upon prescribed criteria.

SUMMARY OF THE INVENTION

In various embodiments, the present invention provides a system and method for SS7 routing and firewall filtering of GSM MSUs that does not require any changes to the operators operating in the SS7 network and provides blocking of specific GSM MSUs that should not be received by an SS7 firewall customer across the SS7 interconnect.

In one embodiment, the present invention provides a method for Signaling System 7 (SS7) routing and firewall filtering, which includes receiving a Global System for Mobile Communications (GSM) message from an SS7 network operator at an SS7 contextual firewall filter executed by a processor, wherein the GSM message comprises a true destination. The method further includes, validating Message Signaling Unit (MSU) contents of the GSM message and validating MSU correctness of the GSM message. Following the validation steps, the method further includes blocking the GSM message from being transmitted toward its true destination if the GSM message fails any one of the validation steps and transmitting the GSM message towards its true destination if the GSM messages passes all the validation steps. The results of the validation and transmission may additionally be reported to the firewall customer.

In various embodiments, the GSM message may be selected from a GSM Mobile Application Part (MAP) message and a GSM Customized Applications for Mobile network Enhanced Logic (CAMEL) Application Part (CAP) message. Additionally, the SS7 network operator may be selected from an American National Standard (ANSI) operator and an International Telecommunication Union (ITU) operator.

In one embodiment, validating MSU contents of the GSM message may further include, performing Home Location Register (HLR) interrogation to identify a subscriber current registered location and storing the current registered location of the subscriber in cache memory coupled to the processor executing the SS7 contextual firewall filter.

In another embodiment, validating MSU contents of the GSM message may further include one or more of, comparing originating switch information in a Transaction Capabilities Application Part (TCAP) section of the GSM message to a Signaling Connection Control Part (SCCP) Calling Party Global Title Address, comparing destination switch information in the TCAP section of the GSM message to the SCCP Called Party Global Title Address, comparing originating switch information in the TCAP section of the GSM message and originating switch or originating subscriber information in the Origination Reference Number in a User Information field of the TCAP dialog to the SCCP Calling Party Global Title Address and comparing destination switch information in the TCAP section of the GSM message and destination switch or destination subscriber information in the Destination Reference Number in a User Information field of the TCAP dialog to the SCCP Called Party Global Title Address.

In an additional embodiment, validating MSU correctness of the GSM message may further include, validating MSU correctness per operation code, per Application Context (AC) number or per AC version.

When the GSM message is coming from a Mobile Switching Center (MSC)/Visited Location Register (VLR)/Serving General Packet Radio Service (GPRS) Support Node (SGSN) and going towards a Home Location Register (HLR)/Short Message Service Center (SMSC), validating MSU correctness of the GSM message may further include one or more of, validating Sub System Number (SSN) in the Signaling Connection Control Part (SCCP) for Called Party Address Parameter (CdPA) and Calling Party Address Parameter (CgPA), validating SCCP type for CdPA and CgPA, validating Translation Type (TT) values in ANSI SS7 in SCCP CdPA Global Title Address Field and CgPA Global Title Address Field and validating Numbering Plan (NP) values in ITU SS7 in SCCP CdPA Global Title Address Field and CgPA Global Title Address Field.

When the GSM message is coming from HLR/SMSC and going towards a MSC/VLR/SGSN, validating MSU correctness of the GSM message may further include one or more of, validating SSN in the SCCP for CdPA and CgPA, validating SCCP type for CdPA and CgPA, validating TT values in ANSI SS7 in SCCP CdPA Global Title Address Field and CgPA Global Title Address Field and validating NP values in ITU SS7 in SCCP CdPA Global Title Address Field and CgPA Global Title Address Field.

When the GSM message is coming from an MSC/VLR and going towards a HLR/Short Message Service Center (SMSC) Message Origination (MO), validating MSU correctness of the GSM message may further include one or more of, validating SSN in the SCCP for CdPA and CgPA, validating SCCP type for CdPA and CgPA, validating TT values in ANSI SS7 in SCCP CdPA Global Title Address Field and CgPA Global Title Address Field and validating NP values in ITU SS7 in SCCP CdPA Global Title Address Field and CgPA Global Title Address Field.

In additional embodiment, validating MSU correctness of the GSM message may further include, validating values of a Message Transfer Part (MTP) Originating Point Code (OPC) and an MTP Destination Point Code (DPC) and validating a national/international bit, a Global Title Indicator (GTI), a Translation Type (TT), a Numbering Plan (NP), an Encoding Scheme (ES), a Sub System Number (SSN) and an Address Indicator (AI).

The present invention further provides a system for Signaling System 7 (SS7) routing and firewall filtering which includes, an SS7 gateway comprising a network interface for receiving a Global System for Mobile Communications (GSM) message from an SS7 network operator, wherein the GSM message comprises a true destination. The system further includes an SS7 contextual firewall filter implemented using computing hardware within the SS7 gateway, wherein the firewall filter is configured for validating Message Signaling Unit (MSU) contents of the GSM message and validating MSU correctness of the GSM message. The system further includes a routing module implemented using the computing hardware, wherein the routing module is configured for blocking the GSM message from being transmitted toward its true destination responsive to the GSM message failing any one of the validation steps and transmitting the GSM message towards it true destination responsive to the GSM message passing each of the validation steps.

The present invention additionally provides, a computer-readable storage medium having instructions stored thereon that, when executed by a processor, cause the processor to perform operations which include, receiving a Global System for Mobile Communications (GSM) message from an SS7 network operator, wherein the GSM message comprises a true destination, validating Message Signaling Unit (MSU) contents of the GSM message, validating MSU correctness of the GSM message, responsive to the GSM message failing any one of the validation steps, blocking the GSM message from being transmitted toward its true destination and responsive to the GSM message passing each of the validation steps, transmitting the GSM message towards its true destination.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
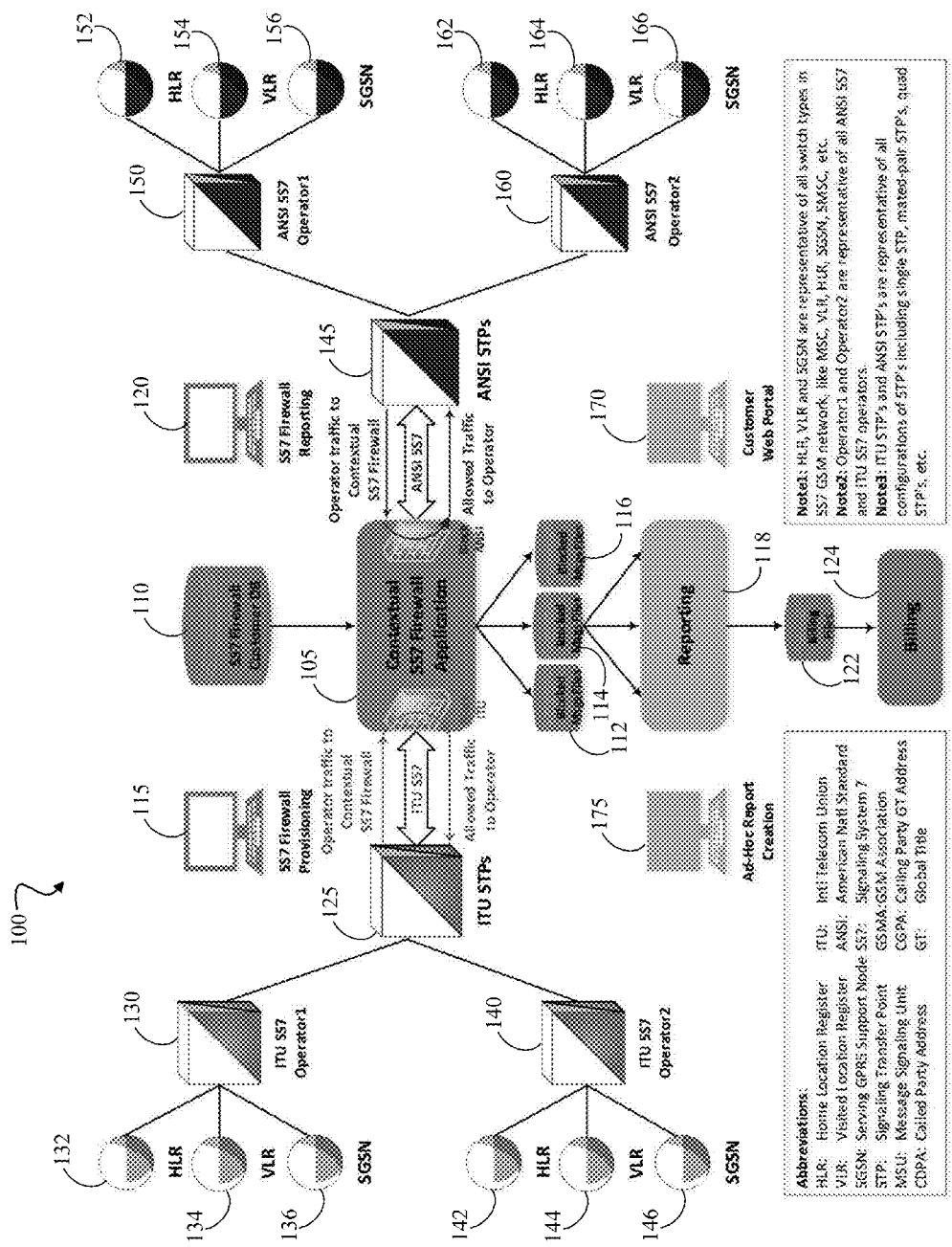
FIG. 1 is a diagram schematically depicting the architecture of a network having Contextual SS7 Firewall.

FIG. 1 illustrates an exemplary architecture 100 of an embodiment of the present invention providing a contextual SS7 firewall filtering application 105. The SS7 firewall filtering application 105 of the present invention validates and selectively blocks certain Global Signal Messaging (GSM) Mobile Application Part (MAP) and GSM CAMEL (Customized Applications for Mobile network Enhanced Logic) Application Part (CAP) messages, based upon a set of predefined criteria.

Mobile Application Part (MAP) is an SS7 protocol that provides an application layer for the various nodes in GSM networks to communicate with each other in order to provide services to mobile subscribers. The MAP is the application-layer protocol used to access the Home Location Register (HLR), Visitor Location Register (VLR) and Serving GPRS (General Packet Radio Services) Support Node (SGSN). MAP provides mobility services, including, but not limited to, location management of the subscriber, authentication, managing service subscription information, fault recovery, subscriber tracing, retrieving a subscriber's IMSI (International Mobile Subscriber Identity), call routing, managing call while roaming in another network, verifying that a subscriber is available to receive calls and SMS (Short Message Service). CAP was developed as a standard for mobile intelligence across different vendor equipment for GSM network to allow a subscriber to roam between different networks, possibly in different countries, will being reachable at the same number and receiving only one bill from their home operator.

In the present invention, the predefined criteria are based upon the specific message type (MAP, CAP) and the SS7 firewall application 105 decides to either allow the messages to reach an intended destination or to block them from being transmitted to towards their intended destination. An objective of the SS7 firewall Application 105 is to prevent fraudulent activity through certain GSM messages which are not allowed through SS7 interconnects.

As shown in FIG. 1, the SS7 contextual firewall application 105 receives input from an SS7 firewall customer database 110. The SS7 contextual firewall application 105 receives ITU SS7 traffic from both ITU Signaling Transfer Points (STPs) 125 and from ANSI STPs 145. ITU STPs and ANSI STPs are representative of all configurations of STP's including, but not limited to, single STPs, mated-pair STPs and quad STPs.

In this embodiment, a first ITU SS7 operator 130 and a second ITU SS7 operator 140 are coupled to the ITU SS7 STP 125. The first ITU SS7 operator and the second ITU SS7 operator are representative of all ITU SS7 operators. Additionally, a first Home Location Register (HLR) 132, a first Visited Location Register (HLR) 134 and a first Serving GPRS Support Node (SGSN) 136 are coupled to the first ITU SS7 operator 130 and a second Home Location Register (HLR) 142, a second Visited Location Register (VLR) 144 and a second Serving GPRS Support Node (SGSN) 146 are coupled to the second ITU SS7 operator 140. In addition, a first ANSI SS7 operator 150 and a second ANSI SS7 operator 160 are coupled to the ANSI SS7 STP 145. The first ANSI SS7 operator and the second ANSI SS7 operator are representative of all ANSI SS7 operators. Additionally, a third Home Location Register (HLR) 152, a third Visited Location Register (HLR) 154 and a third Serving GPRS Support Node (SGSN) 156 are coupled to the first ANSI SS7 operator 150 and a fourth Home Location Register (HLR) 162, a fourth Visited Location Register (VLR) 164 and a fourth Serving GPRS Support Node (SGSN) 166 are coupled to the second ANSI SS7 operator 160. The HLRs, VLRs and SGSNs are representative of all switch types in SS7 GSM networks, including, but not limited to, a Mobile Switching Centers (MSCs) and a Short Message Service Centers (SMSCs).

In operation, the SS7 contextual firewall application 105 receives ITU SS7 and ANSI SS7 traffic from the respective STPs 125, 145, wherein the traffic comprises Global System for Mobile Communication (GSM) messages to be either blocked or transmitted from their true destination. SS7 firewall provisioning 115 may be implemented to provide one or more criteria for blocking the GSM messages and SS7 firewall reporting 120 may additionally be provided.

The SS7 contextual firewall application 105 then validates Message Signaling Unit (MSU) contents of the GSM message and validates MSU correctness of the GSM message. Following the validation steps, the SS7 contextual firewall application 105 further operates by blocking the GSM message from being transmitted toward its true destination if the GSM message fails any one of the validation steps and transmitting the GSM message towards its true destination if the GSM messages passes all the validation steps. The blocked message files 112, 114, 116 may then be compiled for reporting 118 purposes and provided to the firewall via a customer web portal 170, or through ad-hoc report creation 175. Billing files 122 and billing 124 may also be provided as a result of the blocking of the GSM messages.

Accordingly, as shown in FIG. 1, the SS7 contextual firewall application 105 of the present invention validates and blocks certain GSM MAP and GSM CAP messages based upon specific criteria as provisioned for those message types and either allows or blocks them from reaching their true destination. As such, the SS7 contextual firewall application 105 prevents fraudulent activity from being accomplished through certain GSM messages which are not allowed through SS7 interconnects.

The SS7 contextual firewall application is in the path of customer existing SS7 traffic that transitions through ITU SS7 or ANSI SS7 network, thereby providing firewall filtering for many GSM operators. By implementing the SS7 contextual firewall application, the operators are not required to change their SS7 network to be able to block specific GSM MAP and GSM CAP messages that should not be received by an SS7 firewall customer across the SS7 interconnect. Firewall filtering is accomplished in the present invention by routing SS7 traffic going towards SS7 firewall customers from ANSI or ITU STPs to the SS7 contextual firewall application customer specific ANSI or ITU Point Code (PC). The SS7 firewall application will in turn either block or allow GSM MAP and GSM CAP messages. Any blocked messages will be dropped and reported, wherein reporting is performed for messages that could have been blocked (but weren't blocked) and messages that were blocked. Alternatively, blocked messages can be responded to with specific return errors and also reported. Allowed messages will be sent to the customer true destination and reported. Additionally, operators can direct their SS7 traffic to the SS7 contextual firewall application customer specific Point Code for analysis. As such, customers will continue to receive messages on the same SS7 network, regardless of the particular variant of the SS7 protocol being used. For example, ITU SS7 customers will continue to receive messages on the same ITU SS7 network, ANSI SS7 customers will continue to receive messages on the same ANSI SS7 network, China SS7 customers will continue to receive messages on the same China SS7 network, and Japan SS7 customers will continue to receive messages on the same Japan SS7 network. As such, the SS7 contextual firewall application of the present invention assumes the role of both ANSI SS7 and ITU SS7 networks.

GSM messages going towards SS7 firewall customers, from their outbound roaming subscribers, need to be validated prior to being blocked. Accordingly, the SS7 firewall application of the present invention validates the current registered location of the subscriber from the customer HLR, which can be accomplished through one of the GSM MAP messages for interrogating HLR for the subscriber current registered location. The SS7 firewall application will allow an HLR Interrogation Invoke message from the SS7 firewall application based upon the unique Global Title Address used in the Signaling Connection Control Part of SS7 (SCCP) Calling Party Global Title, if Invoke is Global Title routed to the SS7 firewall customer. Additionally, the SS7 firewall application will allow HLR Interrogation Invoke message from the SS7 firewall application based upon the unique Point Code used in Message Transfer Part of SS7 (MTP) Originating Point Code (OPC), if Invoke is MTP Destination Point Code (DPC) routed to the SS7 firewall customer.

If the current registered location of a subscriber is provided by HLR in HLR Interrogation response and the location from where the outbound roaming subscriber GSM message is received (SCCP Calling Party E.164 Global Title Address) are the same, then that particular GSM message will be sent to the SS7 firewall customer switch. If they are not the same, that GSM message will be blocked and reported. Additionally, an HLR Interrogation response is expected to be received within a preconfigured amount of time. If the HLR Interrogation response is not received within the preconfigured amount of time, the original GSM message can be sent to its true destination, wherein the HLR validation failed, and reported, or alternatively, the original GSM message can be blocked and reported. In particular, the SS7 firewall application will allow validation of the current registered location of subscribers as an exact match of E.164 Global Title Address, a partial match, up to a certain number of digits of E.164 Global Title Address, which allows for a range of global title address to be valid for matching criteria, or all E.164 Global Title Addresses from a specific operator.

In a specific embodiment, the SS7 firewall caches the subscriber current registered location from the HLR Interrogation response in internal memory for a configured amount of time as provided by HLR, thereby reducing the number of subscriber location validation queries to the HLR and reducing the amount of additional SS7 traffic on the operator home network.

Additionally, the SS7 firewall caches the subscriber current location from GSM messages received from MSC/VLR/SGSN in internal memory for a configured amount of time, thereby reducing the number of subscriber locations validation queries to the HLR and reducing the amount of additional SS7 traffic on the operator home network.

The SS7 firewall may additionally perform a speed check on the GSM registration and authentication messages to prevent calls originating from far off geographic locations in short periods of time. In this way, Registration Messages are Update Location and Update GPRS Location and the Authentication Message is Send Authentication Information.

In general, validation is performed to ensure that all GSM messages from customer's outbound roaming subscribers are coming from its true and currently registered location and are not being spoofed by some other switch for fraudulent activity.

For GSM message going towards SS7 firewall customers inbound roaming subscribers that need to be validated prior to being blocked, the SS7 contextual firewall application validates that the originating SCCP Global Title Address operator is the same as the owner of the International Mobile Subscriber Identify (IMSI), including the Mobile Country Code (MCC) and the Mobile Network Code (MCN), received in these inbound messages. This validation prevents the spoofing of originating Global Title Addresses for inbound roaming subscribers in the SS7 firewall customer network. As such, the SS7 firewall application will validate and block certain GSM MAP and GSM CAP messages based upon specific criteria as provisional for those message types and either allow or prevent them from reaching their true destination, thereby preventing fraudulent activity to occur through certain GSM message which are not allowed through SS7 interconnects.

The SS7 contextual firewall application is also configured to look into specific fields of the SS7 Message Transfer Part (MTP) and SCCP parts to validate that they are the allowed fields for that transaction. For example, GSM Location Update messages should come from VLR/MSC and go toward HLR. The SS7 firewall application can validate that the Sub System Number (SSN) in the SCCP Called Party Address is either 7 (VLR) or 8 (MSC) and the SSN in the SCCP Called Party Address is 6 (HLR).

MTP field validation performed by the SS7 firewall application may include the MTP Originating Point Codes (OPC) including messages coming from allowed Point Code (s). MTP field validation may also include the Service Indicator Field, which is "3" for SCCP messages, indicating the only allowed SCCP message types through the SS7 firewall. The SS7 firewall application may allow all sub-service field values. Additionally, the Signaling Link Selection (SLS) MTP field may be validated, wherein the SLS is generally rotated for Protocol Class 0 (connectionless without sequence) messages, and is the same for all Protocol Class 1 (connectionless with sequence) messages in a specific dialog, which will be different for different dialogs. SLS validation may include validating all values as valid value but validations can be performed to ensure that not all Protocol Class 1 messages from a specific switch are arriving with the same SLS value.

In addition to MTP field validation, the SS7 firewall application may additionally perform SCCP field validation. In SCCP field validation, the SCCP Called and Calling Party Addresses may be validated, wherein the National/International Address Indicator is set to National (1) or International (0). The Address Indicator, including the Routing Indicator, which is set to Route on Global Title Address or Route on DPC/SSN may be validated in addition to the Global Title Indicator (GTI), which may be set to "2" when used predominantly in ANSI SS7 networks or "4" when used predominantly in ITU SS7 networks. The Translation Type (TT) may also be validated, wherein for GTI=2, TT=9 (E.212) and 10 (E.164) for ANSI SS7 networks and for GTI=4, TT=0 for ITU SS7 networks. The Numbering Plan (NP) may additionally be validated, wherein NP=1 (E.164) and 7 (E.214) in ITU SS7 networks for GTI=4 and NP is not used in ANSI SS7 networks for GTI=2. In addition, the Encoding Scheme (ES) may also be validated, wherein ES=1 (odd) for 2 (even) when used in ITU SS7 networks for GTI=4 and ES is not used in ANSI SS7 networks for GTI=2.

As previously described, in accordance with the present invention, the SS7 contextual firewall application is used to filter the GSM messages by validating the MSU contents of the messages. The exemplary embodiments in FIGS. 2-6 illustrate the steps in which GSM MAP and CAP messages undergo MSU contents validation to ensure that each message is properly formatted per its true definition.

Figure 2:
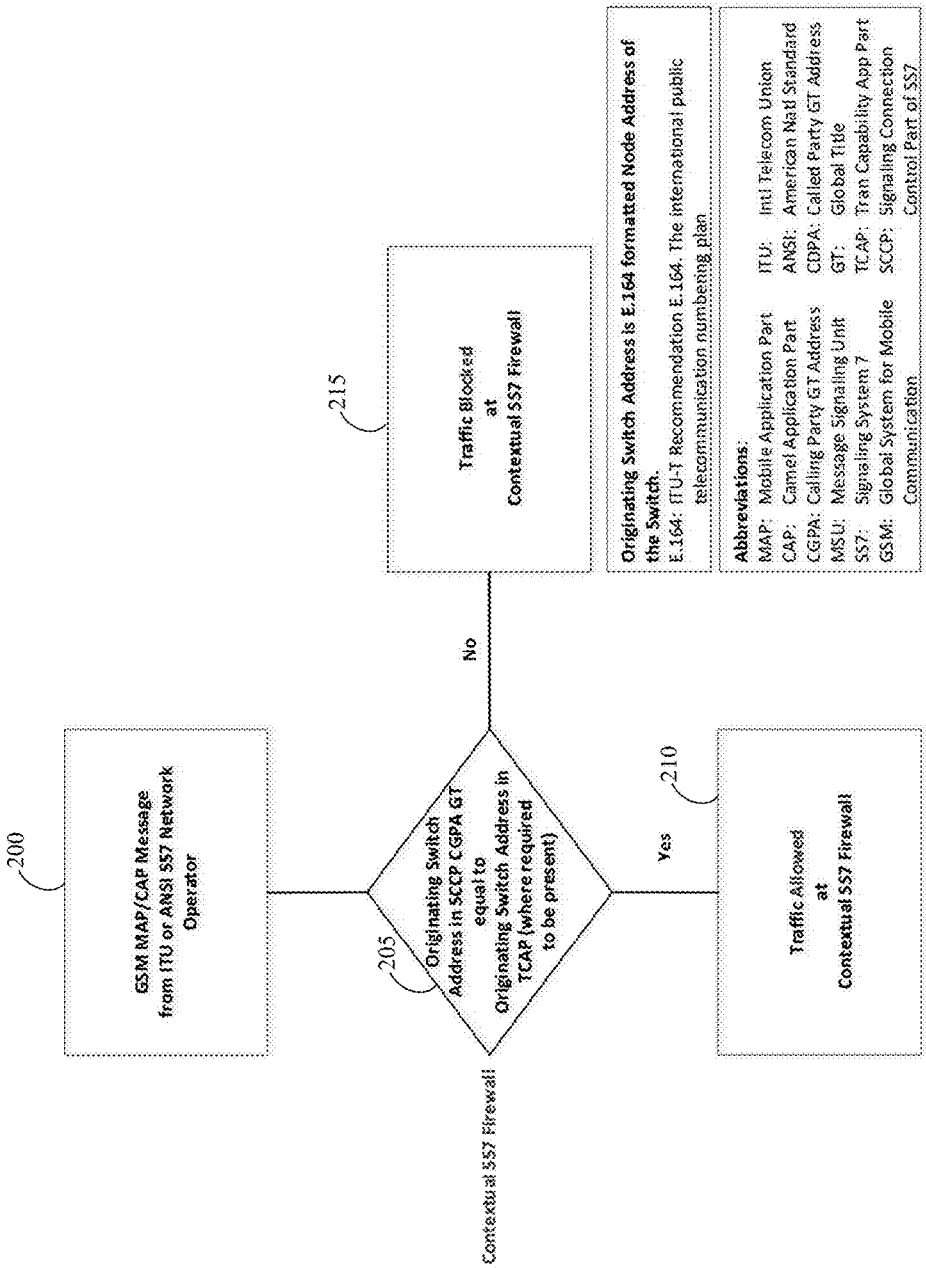
FIG. 2 is a flowchart schematically illustrating the method of comparing originating switch address in SCCP Calling Party Global Title Address with originating switch address in TCAP Message.

Referring to FIG. 2, for GSM MAP/CAP messages received from an ITU or ANSI SS7 network operator 200 that have originating switch information in a Transaction Capabilities Application Part (TCAP) section of the message, this information is compared to the SCCP Calling Party Global Title Address 205. This comparison ensures that SCCP Calling Party Address has not been spoofed. For example, Update Location and Update GPRS Location GSM MAP messages have originating switch address in TCAP section of the message, this originating switch address in TCAP is compared against the originating switch address in SCCP Calling Party Global Title Address to ensure that the switch addresses match. If there is a match, the contextual SS7 firewall allows the traffic 210. Otherwise, the traffic is blocked 215 by the contextual SS7 firewall.

Figure 3:
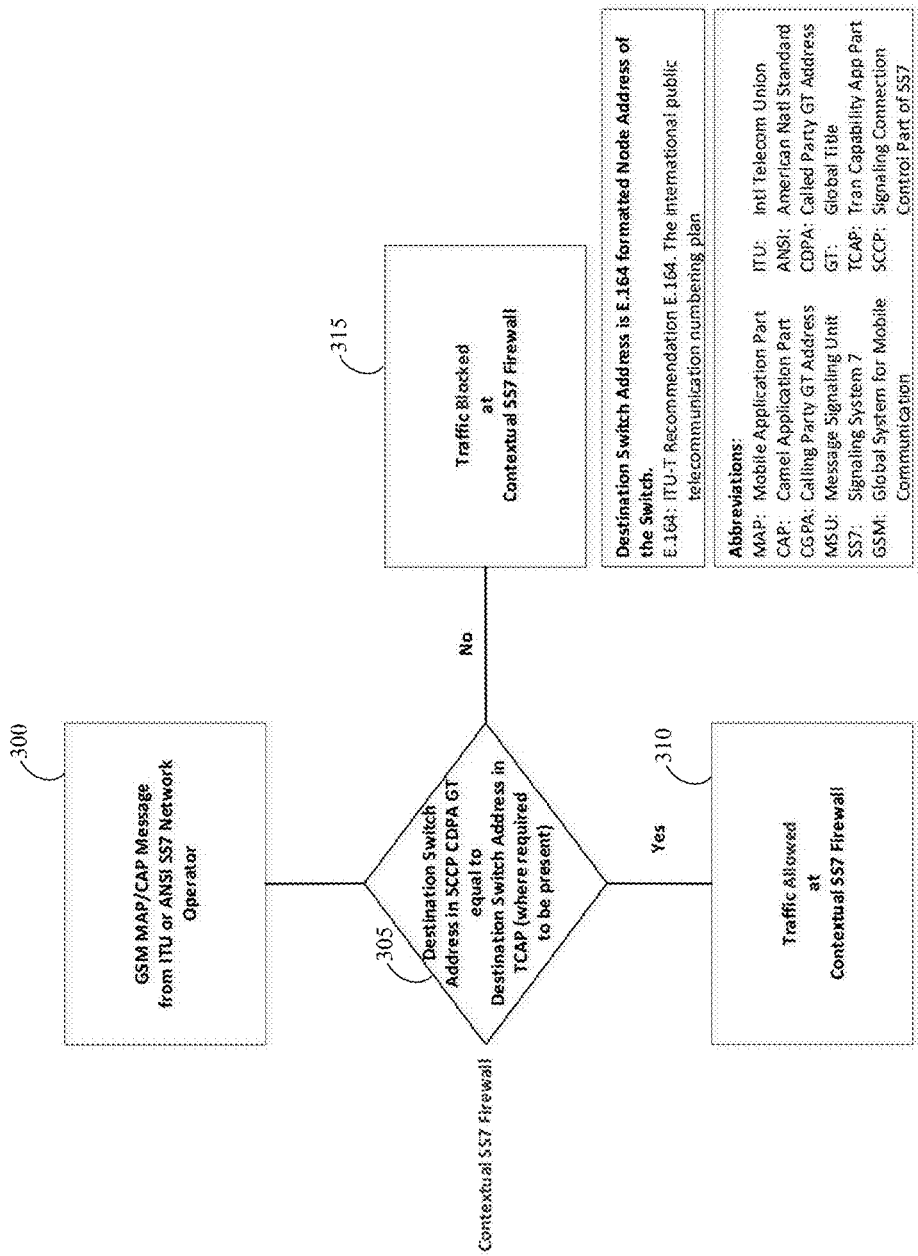
FIG. 3 is a flowchart schematically illustrating the method of comparing destination switch address in SCCP Called Party Global Title Address with destination switch address in TCAP Message.

Referring to FIG. 3, for GSM MAP/CAP messages received from an ITU or ANSI SS7 network operator 300 that have destination switch information in TCAP section of the message, this information is compared against the SCCP Called Party Global Title Address. For example, Send Routing Information for Short Message has destination Mobile Station International Subscriber Director Number (MSISDN) address in the TCAP section of the message, this destination MSISDN address in TCAP is compared against the destination MSISDN address in the SCCP Called Party Global Title Address, to verify whether they match 305. If there is a match, the SS7 firewall allows the messages to pass through to their destination 310. Otherwise, the messages are blocked 315.

Figure 4:
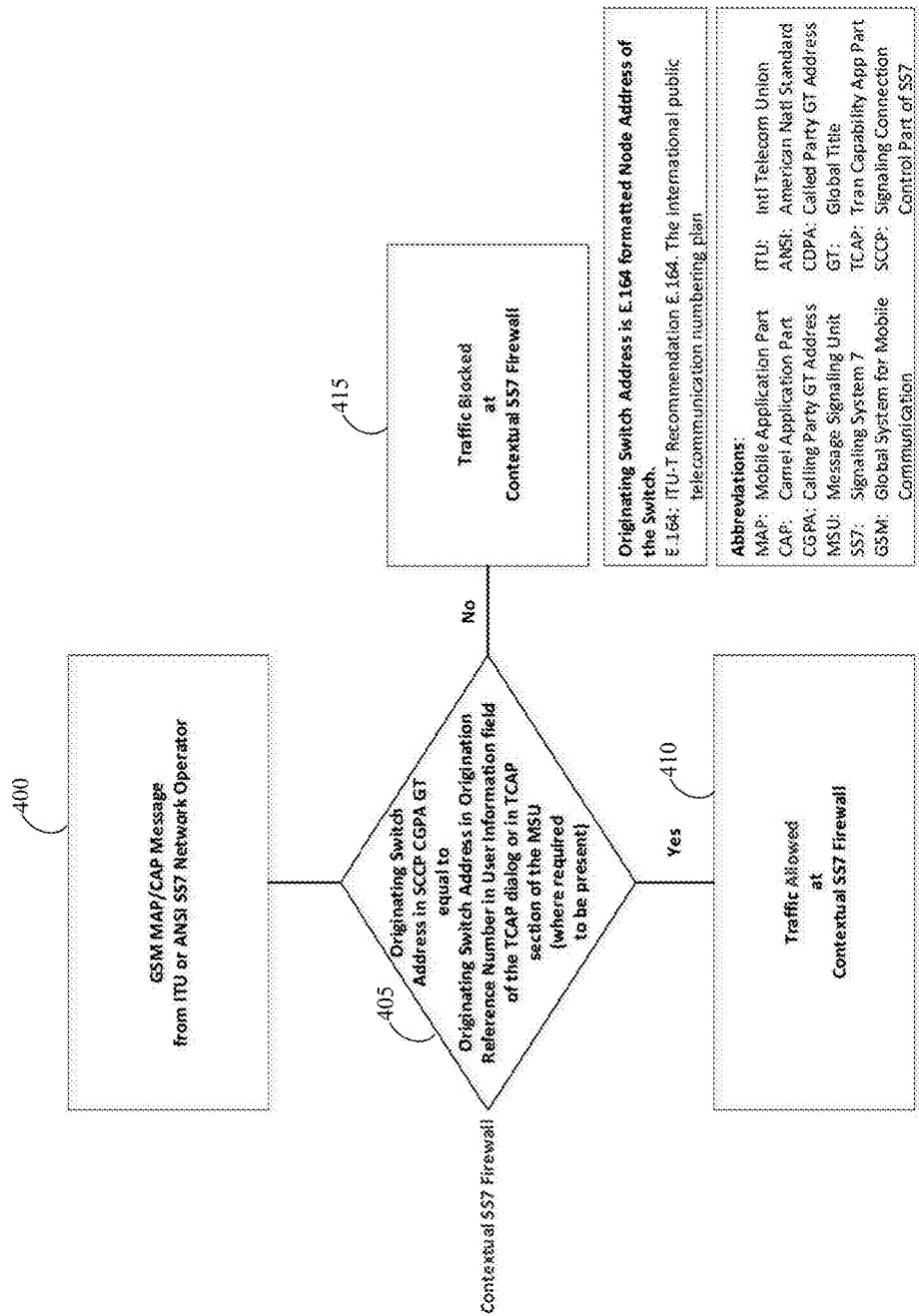
FIG. 4 is a flowchart schematically illustrating the method of comparing originating switch address in SCCP Calling Party Global Title Address with originating switch address in originating reference number in User Information Field of TCAP Dialog or in TCAP section of the MSU.

FIG. 4 provides an example of another criterion that can be used by the SS7 firewall to assess the traffic and determine whether it should be allowed or blocked. This example pertains to GSM MAP/CAP messages received from an ITU or ANSI SS7 network operator 400 that have originating switch or originating subscriber information in TCAP section of the message, and originating switch or originating subscriber information in Origination Reference Number in User Information field of the TCAP dialog. This information is compared against the SCCP Calling Party Global Title Address 405. The SS7 firewall allows the traffic if there is a match 410. Otherwise, the traffic is blocked 415.

Figure 5:
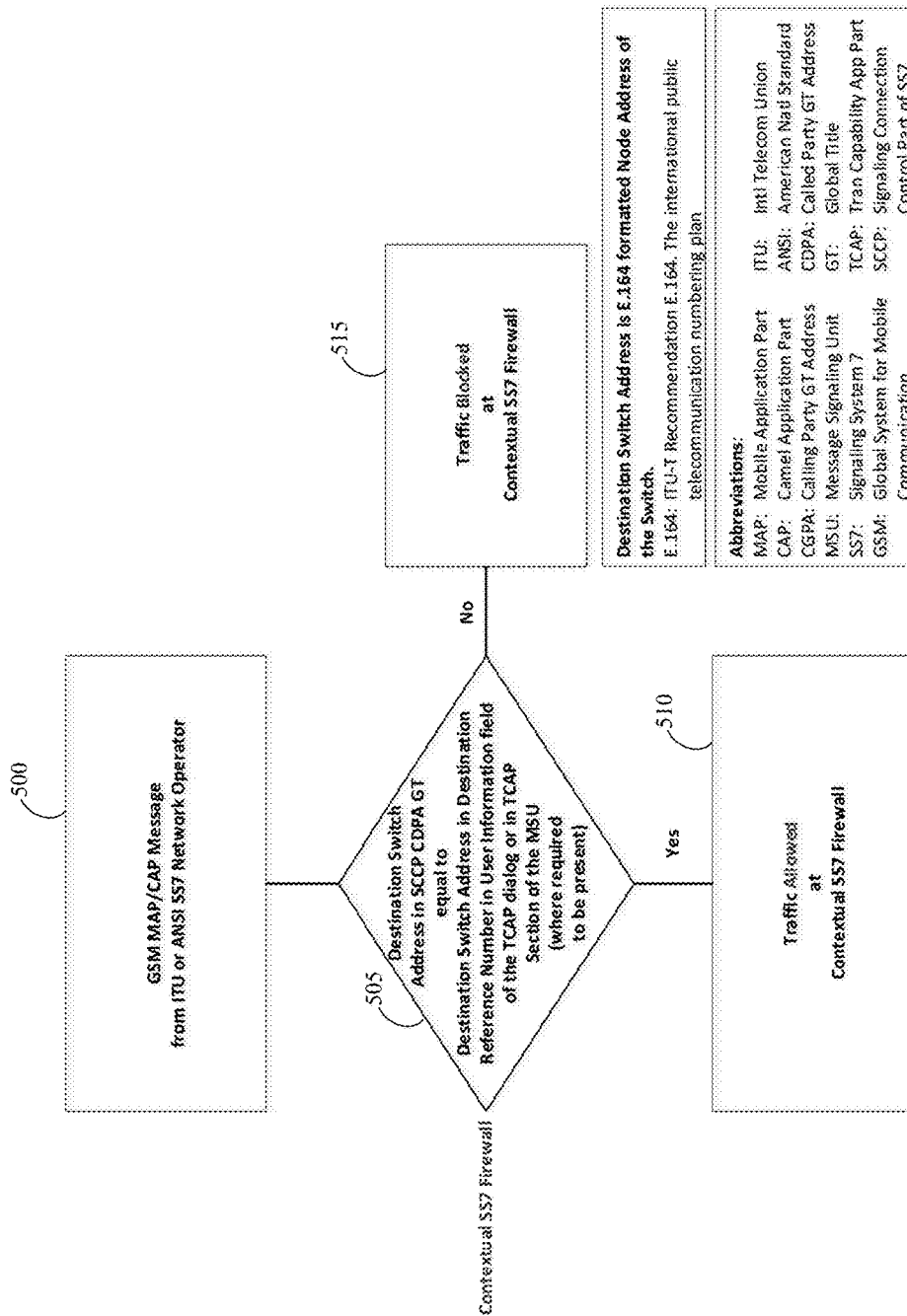
FIG. 5 is a flowchart schematically illustrating the method of comparing destination switch address in SCCP Called Party Global Title Address with destination switch address in destination reference number in User Information Field of TCAP Dialog or in TCAP section of the MSU.

FIG. 5 provides an example pertaining to GSM MAP/CAP messages received from an ITU or ANSI SS7 network operator 500 and the application of the SS7 firewall based on verifying the destination switch address in SCCP Called Party Global Title Address against a destination switch address in Destination Reference Number in the User Information Field of the TCAP Dialog or in TCAP section of the MSU 505. If the SS7 firewall determines a match, the traffic is allowed 510, otherwise, the traffic is blocked 515.

Figure 6:
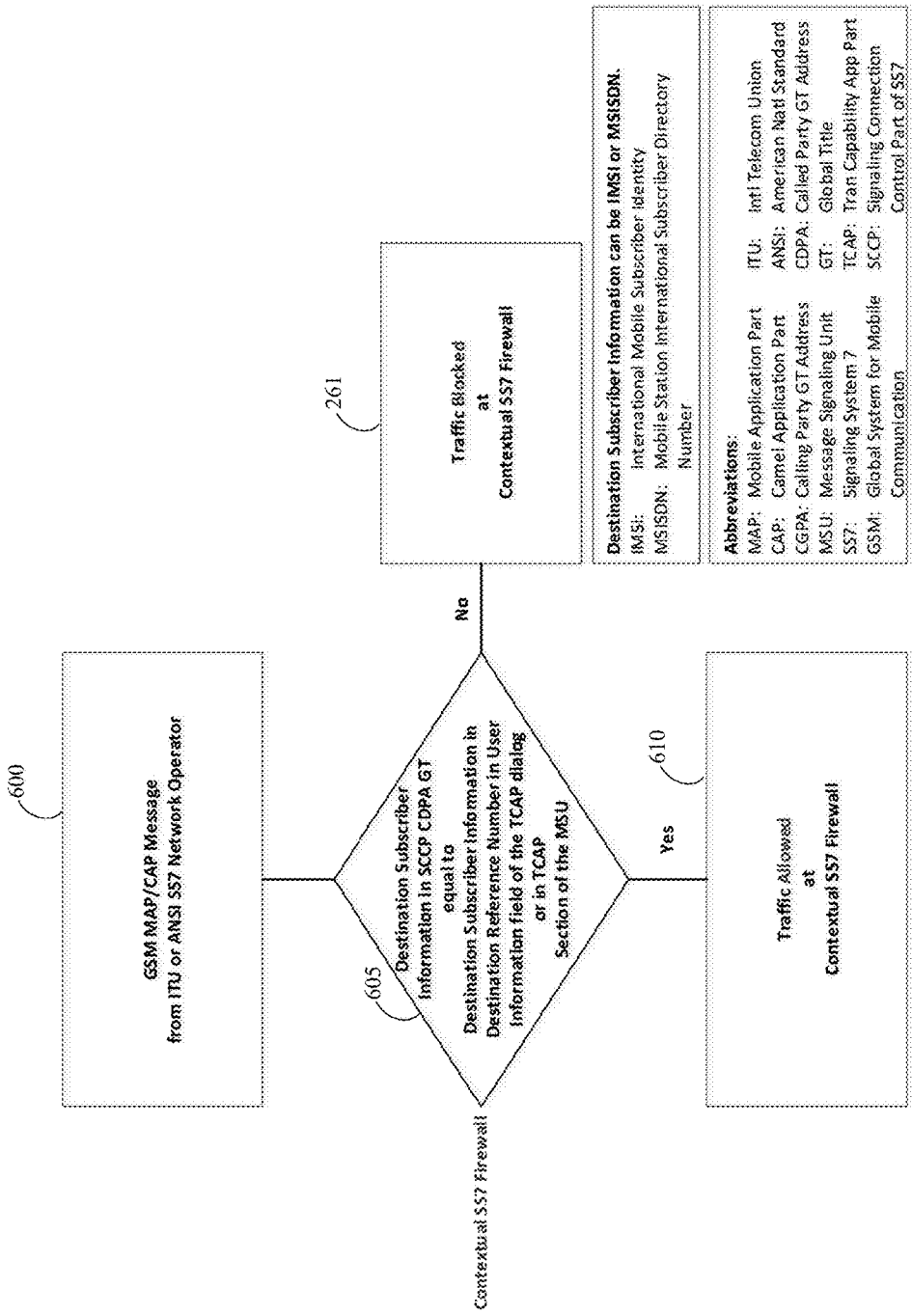
FIG. 6 is a flowchart schematically illustrating the method of comparing destination subscriber information in SCCP Called Party Global Title Address with destination subscriber information in destination reference number in User Information Field of TCAP Dialog or in TCAP section of the MSU.

FIG. 6 provides yet another example of the invention. This example pertains to GSM MAP/CAP messages received from an ITU or ANSI SS7 network operator 600 that have destination switch or destination subscriber information in TCAP section of the message, and destination switch or destination subscriber information in Destination Reference Number in User Information field of the TCAP dialog. The SS7 firewall compares this information against the SCCP Called Party Global Title to determine whether the traffic should be allowed or blocked 605. For example, Register Supplementary Service, Activate Supplementary Service and Deactivate Supplementary Service GSM MAP messages have Called IMSI in Destination Reference Number in User Information field of the TCAP dialog. This destination IMSI address in the TCAP is compared against the destination IMSI address in the SCCP Called Party Global Title Address, to ensure they match. If a match is detected, the traffic is allowed 610, otherwise, the traffic is blocked 615.

Figure 7:
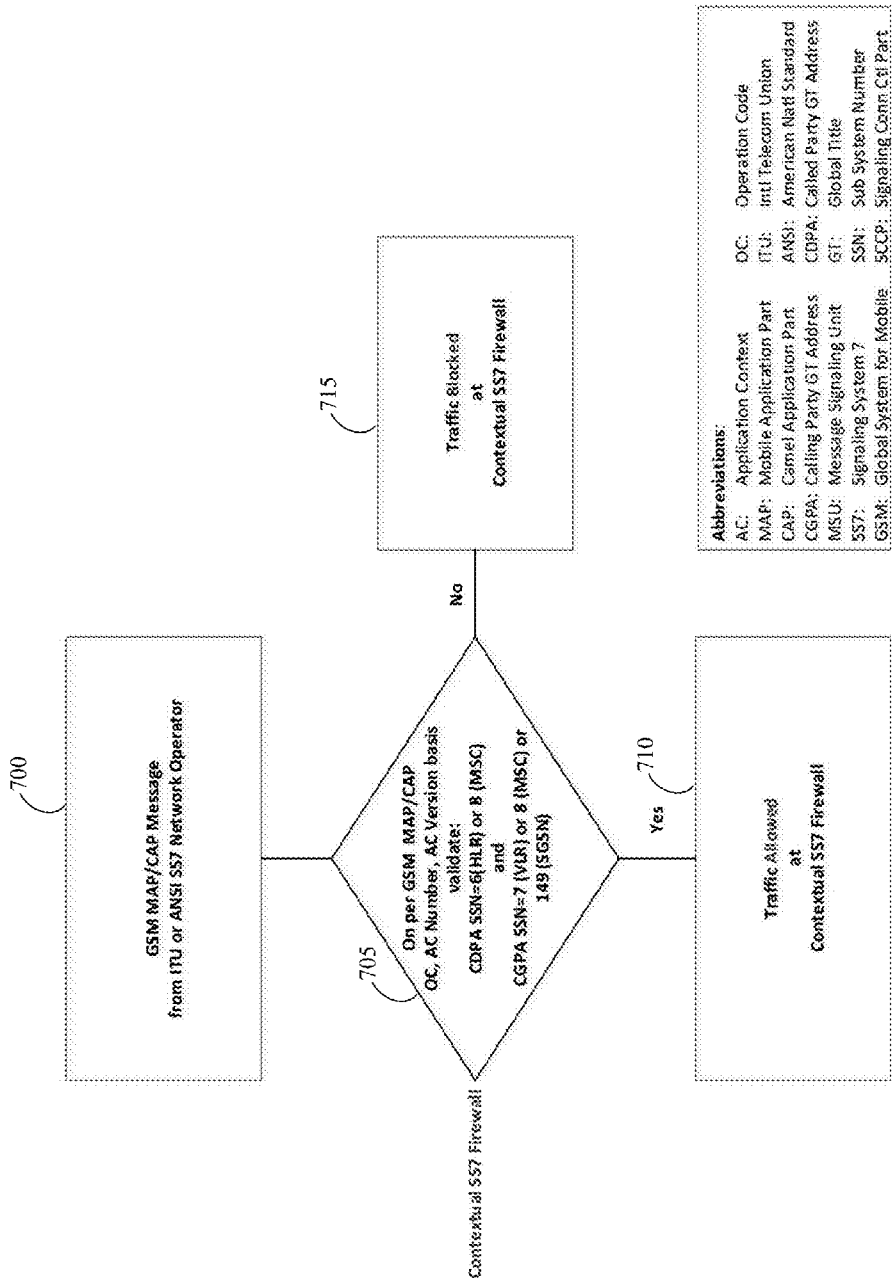
FIG. 7 is a flowchart schematically illustrating the method of SSN validation of MSU correctness for Serve (MSC, VLR, SGSN) originated GSM MAP and CAP messages.
Figure 8:
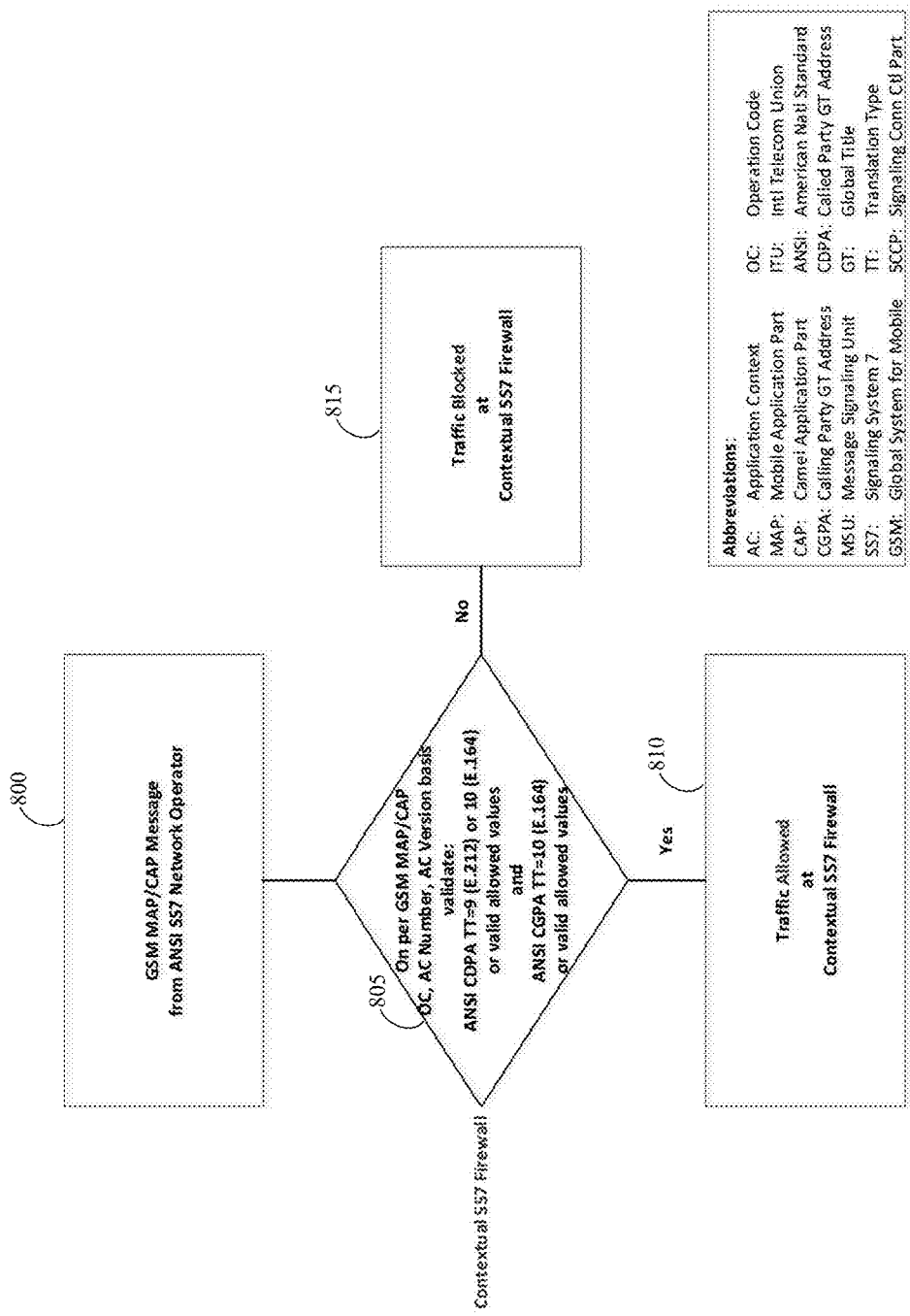
FIG. 8 is a flowchart schematically illustrating the method of ANSI SS7 TT validation of MSU correctness for Serve (MSC, VLR, SGSN) originated GSM MAP and CAP messages.
Figure 9:
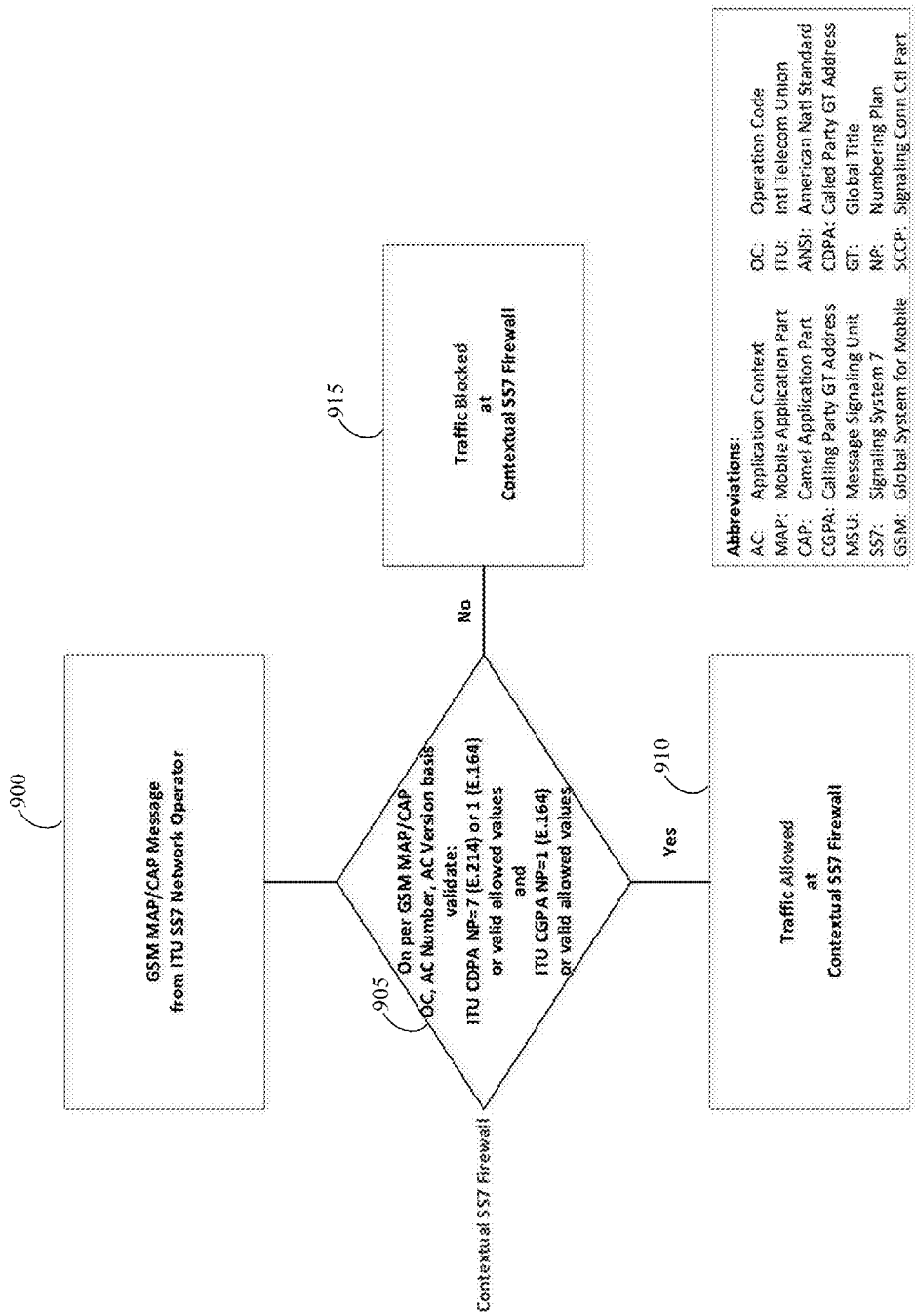
FIG. 9 is a flowchart schematically illustrating the method of ITU SS7 NP validation of MSU correctness for Serve (MSC, VLR, SGSN) originated GSM MAP and CAP messages.

In additional to validating the MSU contents of the message, the SS7 contextual firewall application is also used to filter the GSM messages by validating the MSU correctness of the messages. FIGS. 7-9 illustrate the steps in which GSM MAP and CAP messages undergo MSU Correctness check to ensure that each message is properly formatted per its true definition. For example, Update Location messages should only be coming from VLR and going towards HLR.

MSU correctness ensures that similar rules are followed for all message types. GSM messages originating from MSC/VLR/SGSN and going towards HLR/SMSC will be validated to ensure that the following conditions are met.

In particular, the SS7 firewall validates the MSU correctness on a per-opcode (GSM MAP and CAP) message basis. This ensures that a specific SS7 MSU that is generated from a specific switch follows the guidelines of that particular MSU operation code as defined in GSM MAP standard (3GPP TS 29.002). Some of the examples of MSU Correctness are described below and illustrated in FIGS. 7-15.

First, as depicted in FIG. 7, the SS7 Firewall checks whether the GSM MAP/CAP messages received from the ITU or ANSI SS7 network operators 700 have the correct SSN in the SCCP Called Party Address (CDPA) (SSN=6 HLR) and the Calling (SSN=7 VLR or 8 MSC or 149 SGSN) Party Addresses (CGPA). The SS7 firewall validates the CDPA and the CGPA 705 and allows traffic to flow to the destination if the values can be validated 710 and blocks the traffic if the values are not validated 715.

Second, as depicted in FIGS. 8 and 9, the SS7 firewall verifies that the messages have the correct type of SCCP Called Party Global Title Address and Calling Party Global Title Address used (E.164 or E.214 or E.212) on a per opcode, Application Context and Application Context version basis.

FIG. 8 illustrates validation conditions for ANSI SS7 TT Validation for GSM MAP/CAP messages received from the ITU or ANSI SS7 network operators 800 originating from MSC/VLR/SGSN and going towards HLR/SMSC will be validated to ensure that the following conditions are met. In FIG. 8, the SS7 Firewall verifies that these GSM messages have correct Translation Type (TT) values used in ANSI SS7 in SCCP Called and Calling Party Global Title Address Fields 805. The SS7 firewall allows traffic to flow to the destination if the values can be validated 810 and blocks the traffic if the values are not validated 815.

FIG. 9 illustrates validation conditions for ITU SS7 NP Validation for GSM MAP/CAP messages received from the ITU or ANSI SS7 network operators 900 originating from MSC/VLR/SGSN and going towards HLR/SMSC will be validated to ensure that the following conditions are met. The SS7 firewall also verifies that the messages have the correct Numbering Plan (NP) values used in ITU SS7 in SCCP Called and Calling Party Global Title Address Fields 905. The SS7 firewall allows traffic to flow to the destination if the values can be validated 910 and blocks the traffic if the values are not validated 915.

Figure 10:
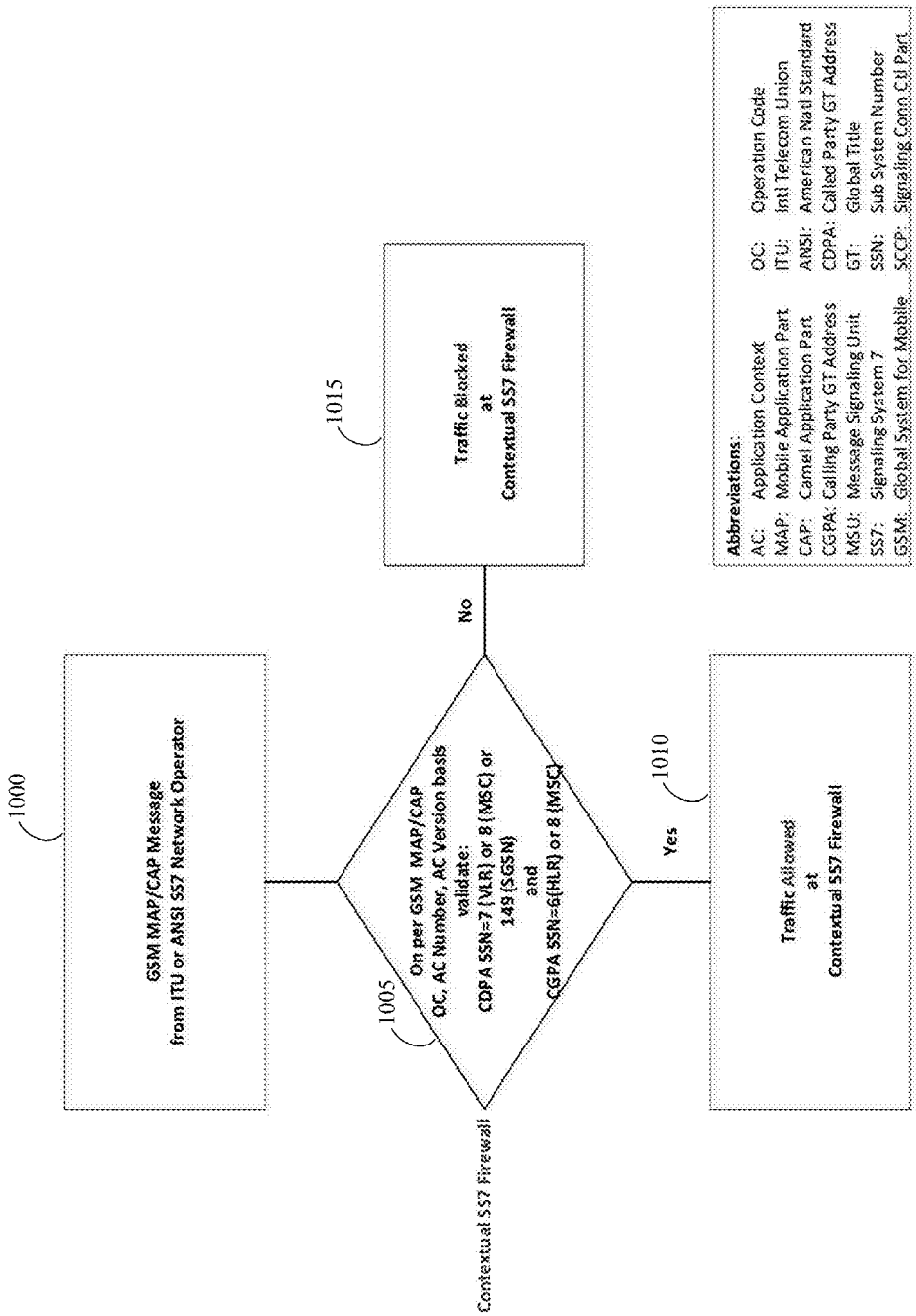
FIG. 10 is a flowchart schematically illustrating the method of SSN validation of MSU correctness for Home (HLR, SMSC) originated GSM MAP and CAP messages.
Figure 11:
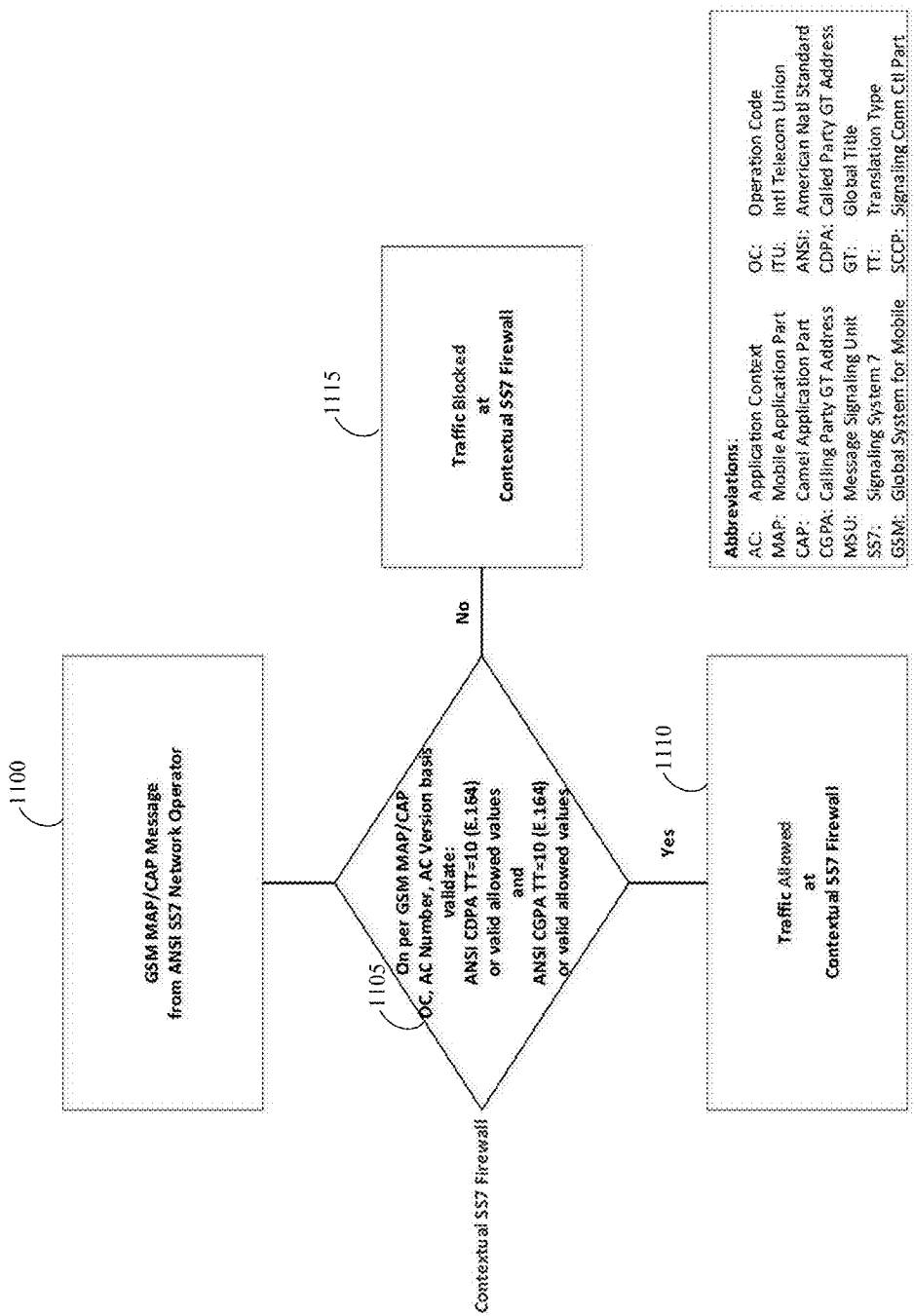
FIG. 11 is a flowchart schematically illustrating the method of ANSI SS7 TT validation of MSU correctness for ANSI SS7 Network Operator originated GSM MAP and CAP messages.
Figure 12:
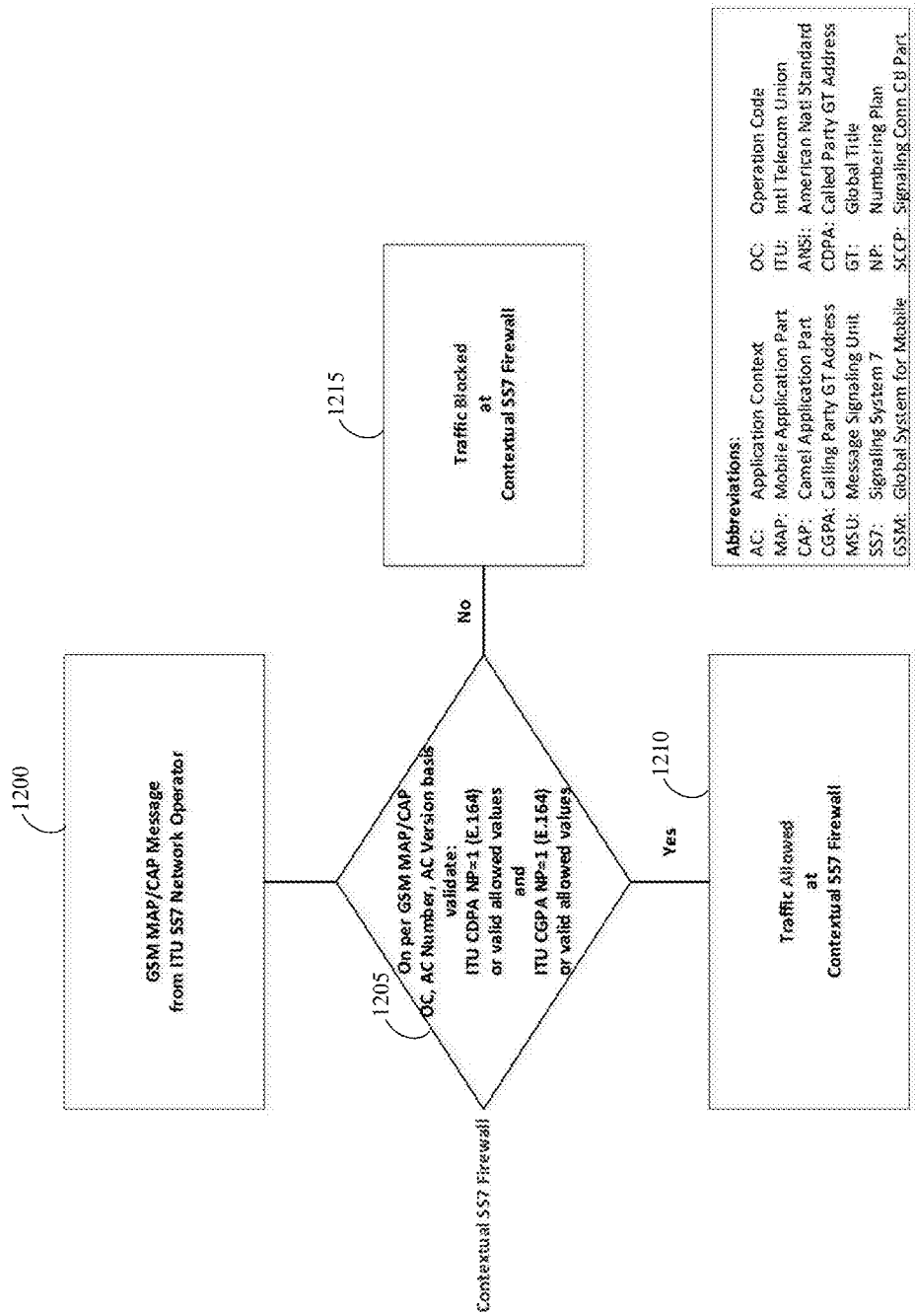
FIG. 12 is a flowchart schematically illustrating the method of ITU SS7 NP validation of MSU correctness for ITU SS7 Network Operator originated GSM MAP and CAP messages.

FIGS. 10-12 illustrate the method of MSU correctness validation for GSM MAP and CAP messages originating from HLR/SMSC and going towards MSC/VLR/SGSN. To validate such messages, the SS7 firewall ensures that the following set of criteria are met.

FIG. 10 depicts the step of verifying that the GSM MAP/CAP messages received from the ITU or ANSI SS7 network operators 1000 have correct SSN in the SCCP Called (SSN=7 VLR or 8 MSC or 149 SGSN) and Calling (SSN=6 HLR) Party Addresses and that the messages have correct type of SCCP Called and Calling Party Global Title Address used on a per opcode, Application Context and Application Context version basis 1005. The SS7 firewall allows traffic to flow to the destination if the values can be validated 1010 and blocks the traffic if the values are not validated 1015.

FIG. 11 illustrates the step of verifying that the GSM MAP/CAP messages received from the ITU or ANSI SS7 network operators 1100 have correct Translation Type (TT)

values used in ANSI SS7 in SCCP Called and Calling Party Global Title Address Fields 1105. The SS7 firewall allows traffic to flow to the destination if the values can be validated 1110 and blocks the traffic if the values are not validated 1115.

FIG. 12 illustrates the step of verifying that the GSM MAP/CAP messages received from the ITU or ANSI SS7 network operators 1100 have correct Numbering Plan (NP) values used in ITU SS7 in SCCP Called and Calling Party Global Title Address Fields 1205. The SS7 firewall allows traffic to flow to the destination if the values can be validated 1210 and blocks the traffic if the values are not validated 1210.

Similarly to the methods described above, GSM messages originating from MSC and going towards SMSC (SMS MO) will be validated to ensure that the following criteria are satisfied: (1) the messages have correct SSN in the SCCP Called (SSN=8 MSC) and Calling (SSN=8 MSC); (2) the messages have correct type of SCCP Called and Calling Party Global Title Address used on a per opcode, Application Context and Application Context version basis; (3) the messages have correct Translation Type (TT) values used in ANSI SS7 in SCCP Called and Calling Party Global Title Address Fields; and (4) they have correct Numbering Plan (NP) values used in ITU SS7 in SCCP Called and Calling Party Global Title Address Fields.

Certain messages are MSISDN routed (SCCP Called Party Global Title Address is MSISDN) like Send Routing Info for Short Message (SRI_SM) that goes through MSISDN validations across STP provisioning tables. Fraudsters can use subscriber IMSI to route these messages directly to HLR, thus bypassing MSISDN level validations. Contextual SS7 Firewall prevents this type of message specific routing.

Figure 13:
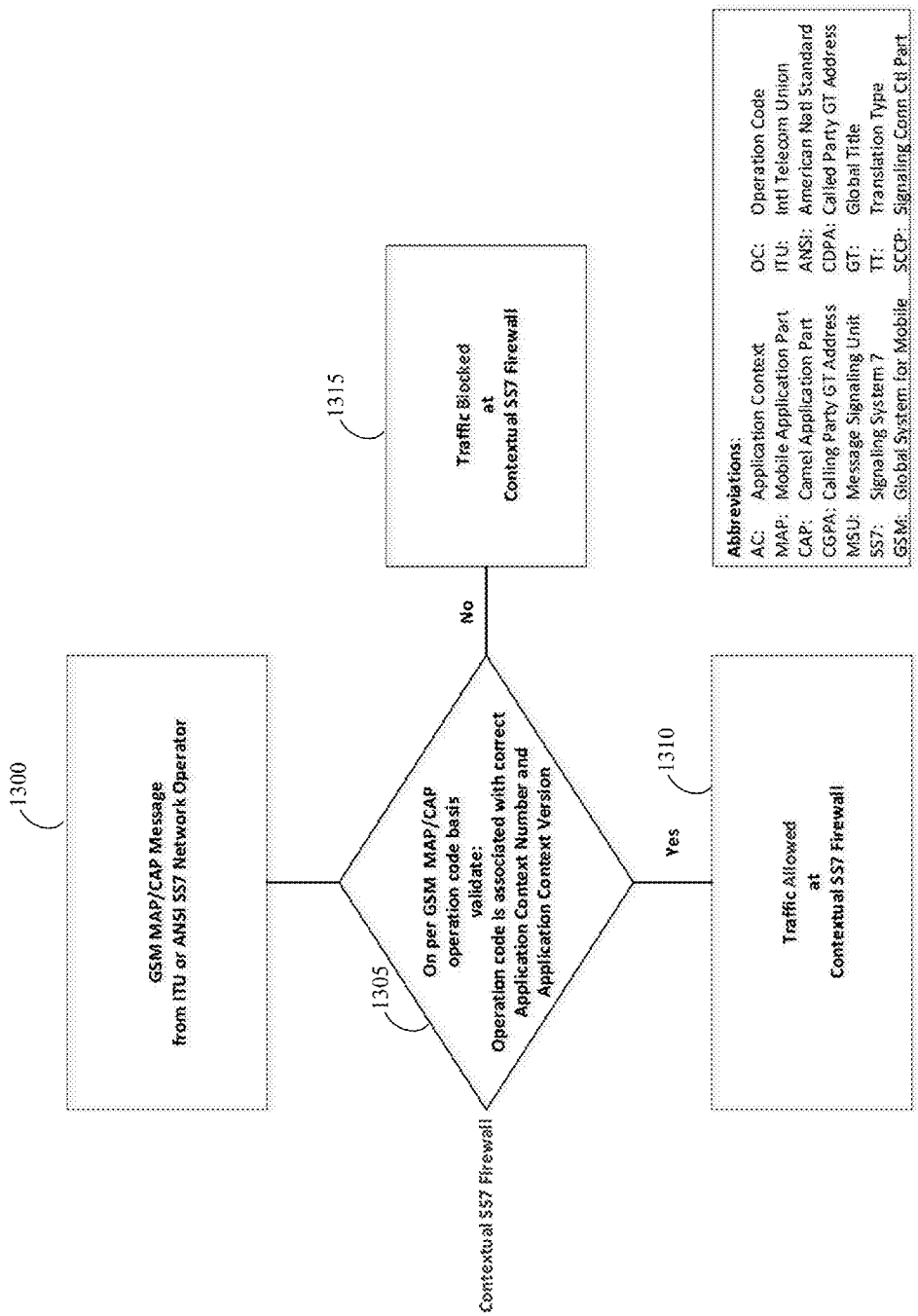
FIG. 13 is a flowchart schematically illustrating the method of MSU correctness validation based on Operation Code to Application Context number and version.

Referring to FIG. 13, the SS7 Firewall ensures that opcodes (GSM messages) belong to allowed Application Context (AC) for that local operation code and that Application Context version are verified. GSM Messages (operation codes) are defined as part of an Application Context (dialog). Application Context (with AC version) to local Operation Code validation ensures that only valid combinations are allowed. For example, Update Location message (local opcode 2) is part of the Network Location Update Application Context (AC Number 1, AC Version 3). Local Opcode to AC and AC version validation is done to ensure only allowed operations (local opcodes) are present in that Application Context and AC version. In this embodiment, GSM MAP/CAP message received from ITU or ANSI SS7 network operators 1300 are validated on a per operation code basis, to verify that the operation code is associated with the correct Application Context Number and Application Context Version 1305. The SS7 firewall allows traffic to flow to the destination if the operation code is validated 1310 and blocks the traffic if the operation code is not validated 1310.

Figure 14:
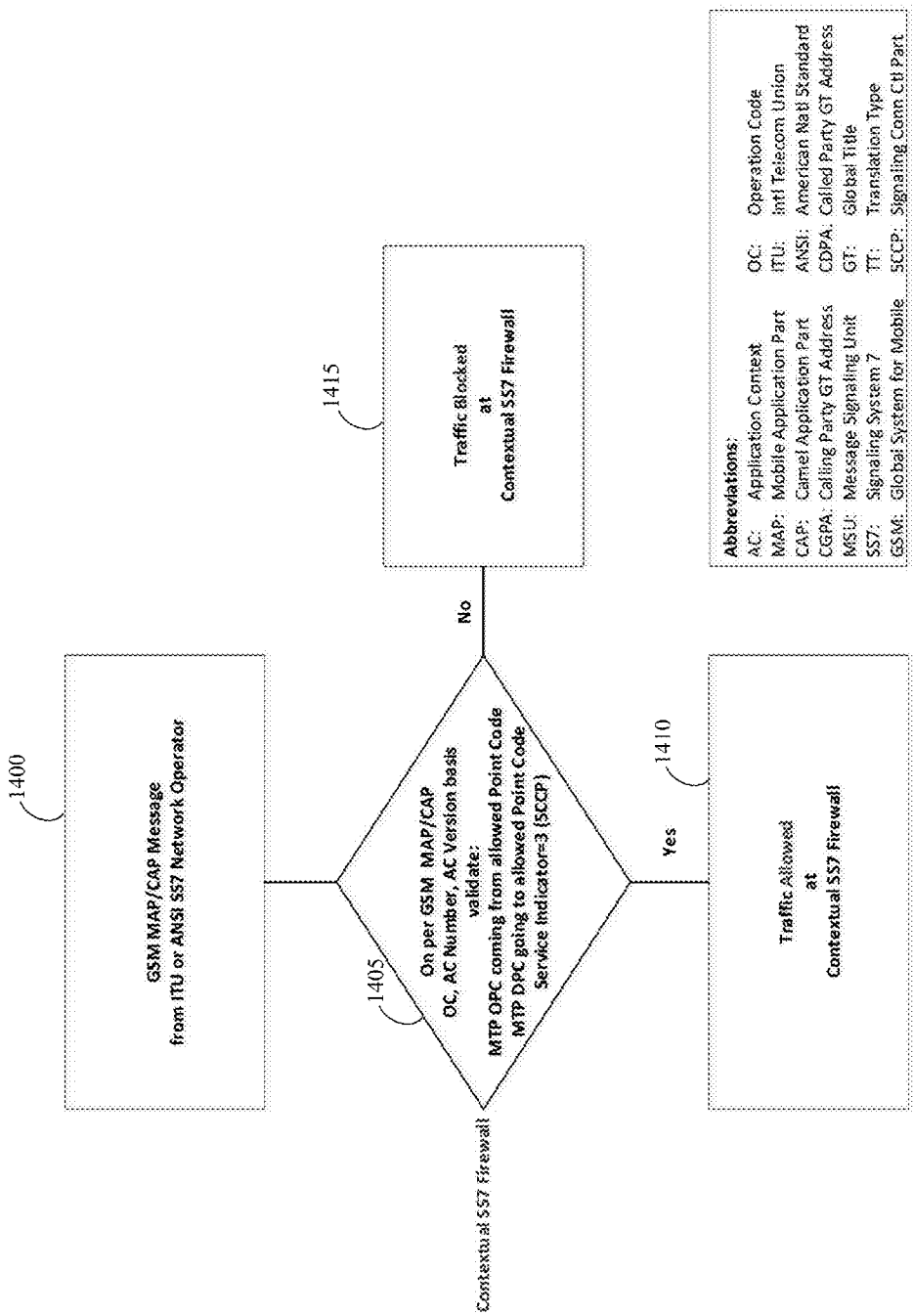
FIG. 14 is a flowchart schematically illustrating the method of MSU correctness validation based on MTP Fields.

FIG. 14 illustrates contextual SS7 MTP Fields Correctness Validation for each MSU from GSM MAP/CAP messages received from ITU or ANSI SS7 network operators 1400. Contextual SS7 Firewall checks specific fields of SS7 MTP part to validate whether they have the allowed values for that transaction (part of GSM MAP and CAP dialog) 1405. The SS7 firewall ensures that, only messages originating from allowed Point Code(s) are allowed to pass through the SS7 firewall, only messages directed to allowed Point Code(s) are allowed to pass through SS7 firewall, messages containing numeral "3" for SCCP are the only message types allowed through the SS7 firewall, and all Sub-Service Messages meeting the criteria are allowed to pass 1405. All traffic not meeting the criteria is blocked 1410.

Figure 15:
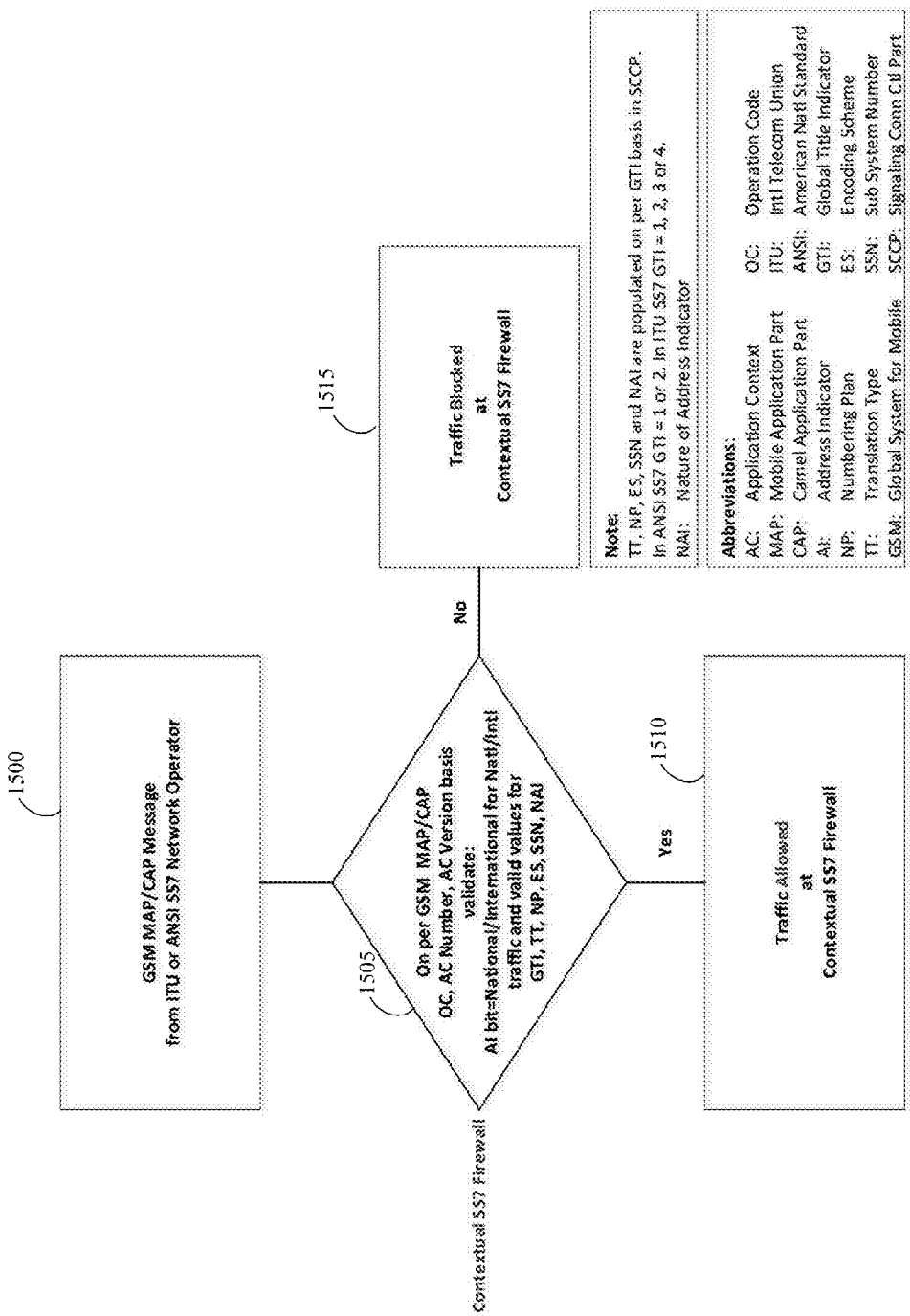
FIG. 15 is a flowchart schematically illustrating the method of MSU correctness validation based on SCCP Fields.

FIG. 15 schematically depicts SS7 firewall checking specific fields of SS7 SCCP part of received GSM MAP/CAP messages 1500 to validate whether those fields have the allowed values for that transaction (part of GSM MAP and CAP dialog) 1505. For example, GSM Update Location message should originate from VLR and be directed toward HLR. Contextual SS7 Firewall verifies that SSN (Sub System Number) in SCCP Calling Party Address is "7" (VLR) and SSN in SCCP Called Party Address is "6" (HLR). The SS7 firewall ensures that, for National SS7 traffic, this bit should be set to National (1) and for International SS7 traffic, this bit should be set to International (0), operator specific validation can be done to ensure if traffic from specific operator is DPC/SSN routed or Global Title routed, DPC/SSN routed traffic can be a flag for fraudulent activity when operator normally routes traffic based on Global Title, Global Title routed traffic can be a flag for fraudulent activity when operator normally routes traffic based on DPC/SSN, GTI=2 used predominantly in ANSI SS7 networks. GTI=4 used predominantly in ITU SS7 networks, in ANSI SS7 Networks for GTI=2: TT=9 (E.212) and TT=10 (E.164) is used predominantly, in ITU SS7 Networks for GTI=4: TT=0 used predominantly in ITU SS7 networks, NP=1 (E.164) and NP=7 (E.214) used predominantly in ITU SS7 Networks for GTI=4 and NP is not used in ANSI SS7 Networks for GTI=2, Encoding Scheme (ES) ES=1 (odd) and ES=2 (even) used in ITU SS7 networks for GTI=4 and ES is not used in ANSI SS7 networks for GTI=2. Messages meeting the criteria are allowed to pass 1405. All traffic not meeting the criteria is blocked 1410.

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

| Definitions, Acronyms, and Abbreviations | |
|---|---|
| Acronyms | Description |
| AC | Application Context |
| ANSI | American National Standards Institute |
| CAMEL | Customized Applications for Mobile Enhanced Logic |
| CAP | CAMEL Application Part |
| DPC | Destination Point Code |
| E.164 | ITU-T International Public Telecommunication |
| E.212 | ITU-T International Identification Plan for Mobile |
| E.214 | ITU-T Structure of the Land Mobile Global Title for |
| ES | Encoding Scheme |
| GPRS | General Packet Radio Service |
| GSM | Global System for Mobile Communication |
| GTI | Global Title Indicator |
| HLR | Home Location Register |
| IMSI | International Mobile Subscriber Identity |
| ITU | International Telecommunications Union |
| MAP | Mobile Application Part |
| MCC | Mobile Country Code |
| MNC | Mobile Network Code |
| MSC | Mobile Switching Center |
| MSISDN | Mobile Station International Subscriber Directory |
| MSU | Message Signaling Unit |
| MTP | Message Transfer Part of SS7 |
| NP | Numbering Plan |
| OPC | Originating Point Code |
| RI | Routing Indicator |
| SCCP | Signaling Connection Control Part of SS7 |
| SGSN | Serving GPRS Support Node |
| SLS | Signaling Link Selection |
| SMS MO | Short Message Service Message Origination |
| SMSC | Short Message Service Center |
| SRI SM | Send Routing Info for Short Message |
| SS7 | Signaling System Number 7 |
| SSN | Sub System Number |
| TCAP | Transaction Capabilities Application Part |
| TT | Translation Type |
| UL | Update Location |
| VLR | Visiting Location Register |

While methods, apparatuses, and systems have been described in connection with exemplary embodiments of the various figures, it is to be understood that other similar embodiments can be used or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A method for Signaling System 7 (SS7) routing and firewall filtering, the method comprising:
   receiving, by an SS7 contextual firewall filter executed by a processor, a Global System for Mobile Communications (GSM) message from an SS7 network operator, wherein the GSM message comprises a true destination;
   validating, by the SS7 contextual firewall filter executed by the processor, Message Signaling Unit (MSU) contents of the GSM message;
   validating, by the SS7 contextual firewall filter executed by the processor, MSU correctness of the GSM message;
   responsive to the GSM message failing any one of the validation steps, blocking the GSM message from being transmitted toward its true destination; and
   responsive to the GSM message passing each of the validation steps, transmitting the GSM message towards its true destination.

2. The method of claim 1, wherein the GSM message is selected from a GSM Mobile Application Part (MAP) message and a GSM Customized Applications for Mobile network Enhanced Logic (CAMEL) Application Part (CAP) message.

3. The method of claim 1, wherein the SS7 network operator is selected from an American National Standard (ANSI) operator and an International Telecommunication Union (ITU) operator.

4. The method of claim 1, further comprising, reporting GSM messages that were blocked.

5. The method of claim 1, wherein validating MSU content of the GSM message further comprises:
   performing Home Location Register (HLR) interrogation to identify a subscriber current registered location; and
   storing the current registered location of the subscriber in cache memory coupled to the processor executing the SS7 contextual firewall filter.

6. The method of claim 1, wherein validating MSU contents of the GSM message further comprises one or more of:
   comparing originating switch information in a Transaction Capabilities Application Part (TCAP) section of the GSM message to a Signaling Connection Control Part (SCCP) Calling Party Global Title Address;
   comparing destination switch information in the TCAP section of the GSM message to the SCCP Called Party Global Title Address;
   comparing originating switch information in the TCAP section of the GSM message and originating switch or originating subscriber information in the Origination Reference Number in a User Information field of the TCAP dialog to the SCCP Calling Party Global Title Address; and
   comparing destination switch information in the TCAP section of the GSM message and destination switch or destination subscriber information in the Destination Reference Number in a User Information field of the TCAP dialog to the SCCP Called Party Global Title Address.

7. The method of claim 1, wherein validating MSU correctness of the GSM message further comprises, validating MSU correctness per operation code, per Application Context (AC) number or per AC version.

8. The method of claim 1, wherein the GSM message is coming from a Mobile Switching Center (MSC)/Visited Location Register (VLR)/Serving General Packet Radio Service (GPRS) Support Node (SGSN) and going towards a Home Location Register (HLR)/Short Message Service Center (SMSC), and wherein validating MSU correctness of the GSM message further comprises one or more of:
   validating Sub System Number (SSN) in the Signaling Connection Control Part (SCCP) for Called Party Address Parameter (CdPA) and Calling Party Address Parameter (CgPA);
   validating SCCP type for CdPA and CgPA;
   validating Translation Type (TT) values in ANSI SS7 in SCCP CdPA Global Title Address Field and CgPA Global Title Address Field; and
   validating Numbering Plan (NP) values in ITU SS7 in SCCP CdPA Global Title Address Field and CgPA Global Title Address Field.

9. The method of claim 1, wherein the GSM message is coming from HLR/SMSC and going towards a MSC/VLR/SGSN, and wherein validating MSU correctness of the GSM message further comprises one or more of:
   validating SSN in the SCCP for CdPA and CgPA;
   validating SCCP type for CdPA and CgPA;

validating TT values in ANSI SS7 in SCCP CdPA Global Title Address Field and CgPA Global Title Address Field; and validating NP values in ITU SS7 in SCCP CdPA Global Title Address Field and CgPA Global Title Address Field.

10. The method of claim 1, wherein the GSM message is coming from an MSC/VLR and going towards a HLR/Short Message Service Center (SMSC) Message Origination (MO), and wherein validating MSU correctness of the GSM message further comprises one or more of:

validating SSN in the SCCP for CdPA and CgPA;

validating SCCP type for CdPA and CgPA;

validating TT values in ANSI SS7 in SCCP CdPA Global Title Address Field and CgPA Global Title Address Field; and validating NP values in ITU SS7 in SCCP CdPA Global Title Address Field and CgPA Global Title Address Field.

11. The method of claim 1, wherein validating MSU correctness of the GSM message further comprises, validating values of a Message Transfer Part (MTP) Originating Point Code (OPC) and an MTP Destination Point Code (DPC).

12. The method of claim 1, wherein validating MSU correctness of the GSM message further comprises, validating a national/international bit, a Global Title Indicator (GTI), a Translation Type (TT), a Numbering Plan (NP), an Encoding Scheme (ES), a Sub System Number (SSN) and an Address Indicator (AI).

13. A system for Signaling System 7 (SS7) routing and firewall filtering, the system comprising:

an SS7 gateway comprising:

a network interface for receiving a Global System for Mobile Communications (GSM) message from an SS7 network operator, wherein the GSM message comprises a true destination;

an SS7 contextual firewall filter implemented using computing hardware within the SS7 gateway, wherein the firewall filter is configured for;

validating, by the SS7 contextual firewall filter executed by the processor, Message Signaling Unit (MSU) contents of the GSM message; and validating, by the SS7 contextual firewall filter executed by the processor, MSU correctness of the GSM message;

a routing module implemented using the computing hardware, wherein the routing module is configured for;

responsive to the GSM message failing any one of the validation steps, blocking the GSM message from being transmitted toward its true destination; and responsive to the GSM message passing each of the validation steps, transmitting the GSM message towards its true destination.

14. The system of claim 13, wherein the SS7 network operator is selected from an American National Standard (ANSI) operator and an International Telecommunication Union (ITU) operator.

15. The system of claim 13, wherein validating MSU content of the GSM message further comprises:

performing Home Location Register (HLR) interrogation to identify a subscriber current registered location; and storing the current registered location of the subscriber in cache memory coupled to the processor executing the SS7 contextual firewall filter.

16. The system of claim 13, wherein validating MSU correctness of the GSM message further comprises, validating MSU correctness per operation code, per Application Context (AC) number or per AC version.

17. A non-transitory computer-readable storage medium having instructions stored thereon that, when executed by a processor that executes an SS7 contextual firewall filter, cause the processor to perform operations comprising:

receiving a Global System for Mobile Communications (GSM) message from an SS7 network operator, wherein the GSM message comprises a true destination;

validating Message Signaling Unit (MSU) contents of the GSM message;

validating MSU correctness of the GSM message;

responsive to the GSM message failing any one of the validation steps, blocking the GSM message from being transmitted toward its true destination; and responsive to the GSM message passing each of the validation steps, transmitting the GSM message towards its true destination.

18. The computer-readable storage medium of claim 17, wherein the GSM message is selected from a GSM Mobile Application Part (MAP) message and a GSM Customized Applications for Mobile network Enhanced Logic (CAMEL) Application Part (CAP) message.

19. The computer-readable storage medium of claim 17, wherein the SS7 network operator is selected from an American National Standard (ANSI) operator and an International Telecommunication Union (ITU) operator.

20. The computer-readable storage medium of claim 17, wherein validating MSU content of the GSM message further comprises:

performing Home Location Register (HLR) interrogation to identify a subscriber current registered location; and storing the current registered location of the subscriber in cache memory coupled to the processor executing the SS7 contextual firewall filter.

* * * * *